Figure 1:
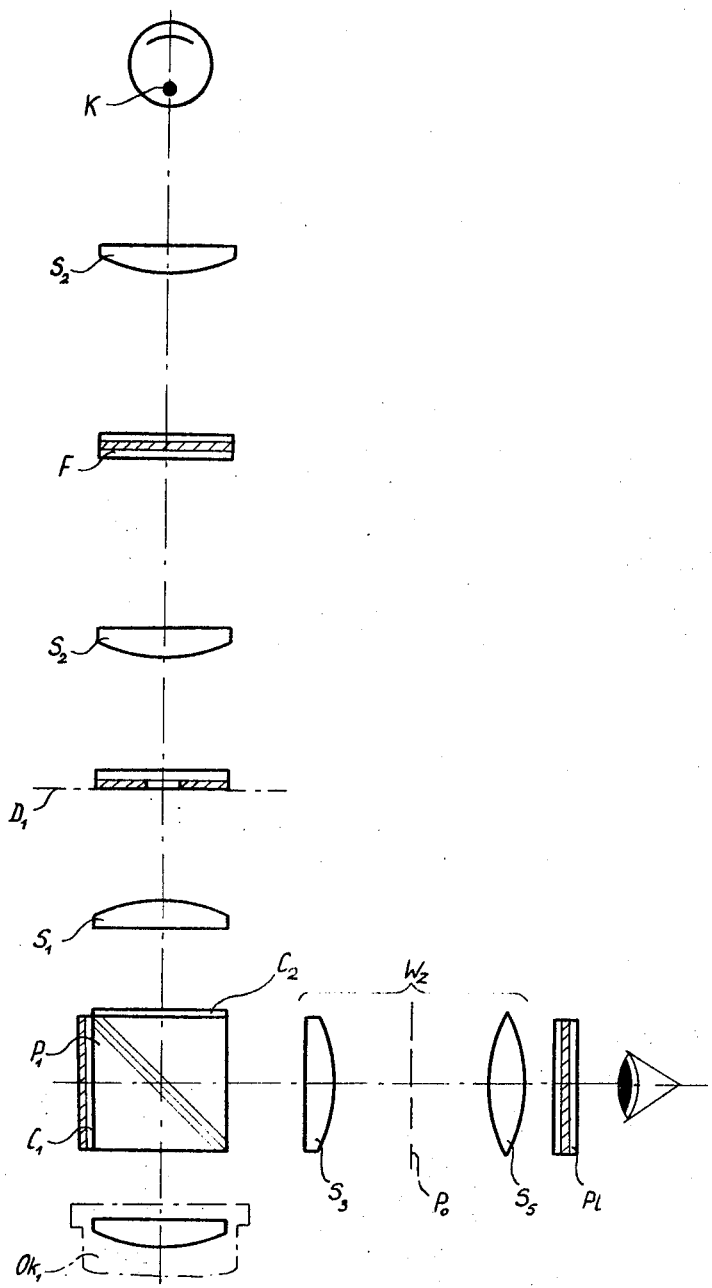

United States Patent
Borkowski et al.

[15] 3,652,163
[45] Mar. 28, 1972

[54] PHOTOMETER FOR OBSERVATION INSTRUMENTS MAINLY FOR MICROSCOPES

[72] Inventors: Wieslaw K. Borkowski; Maksymilian Pluta; Maciej Popielas, all of Warszawa, Poland

[73] Assignee: Centralne Laboratorium Astyki, Warszawa, Poland

[22] Filed: Apr. 22, 1970

[21] Appl. No.: 30,798

[30] Foreign Application Priority Data

May 2, 1969 Poland..................................P 133336

[52] U.S. Cl............................356/115, 350/14, 350/157, 350/169, 350/171, 350/174
[51] Int. Cl..........................G01n 21/110, G02b 27/14
[58] Field of Search...............................356/115 X; 350/12-19, 169-174, 157

[56] References Cited

UNITED STATES PATENTS

| | | |
|---|---|---|
| 2,246,817 | 6/1941 | Saver.....................................356/119 |
| 3,421,806 | 1/1969 | Weber......................................350/19 |
| 3,512,868 | 5/1970 | Gorkiewicz et al......................350/157 |

*Primary Examiner*—Ronald L. Wibert
*Assistant Examiner*—R. J. Webster
*Attorney*—Irvin A. Lavine

[57] ABSTRACT

Photometer enabling simultaneous observation of an object being investigated and of a measuring diaphragm, provided with visual and measuring systems, wherein one or two polarizing been splitters divide the main light beam entering into the instrument into two beams which are linearly polarized. The image of the measuring diaphragm is projected on the background of the image of the object being investigated by means of special plates which turn the direction of the light vibrations and change the kind of light polarization from linear to circular. The images of the measuring diaphragm and of the investigated object are formed by two beams which are linearly polarized, whereby the directions of light vibrations are mutually perpendicular. The visual system of the photometer has a polarizing filter, enabling the controlling of the ratio of luminance of the measuring diaphragm image to that of the investigated object image.

4 Claims, 2 Drawing Figures

PHOTOMETER FOR OBSERVATION INSTRUMENTS MAINLY FOR MICROSCOPES

The present invention relates to a photometer for observation instruments, mainly for microscopes, enabling simultaneous observation of an object being investigated and of a measuring diaphragm limiting the photometrically analysed field.

There are known several constructions of photometers in which the image of the investigated object is formed in the plane of the measuring diaphragm and is inspected by means of a visual system.

In the simplest known system the main light beam coming out of the observation instrument, for example of a microscope, is directed to the measuring and visual systems by means of an element dividing the light, whereafter the operator does not observe the image of the measuring diaphragm on the background of the investigated object. The magnitude of the measuring diaphragm is determined by marks provided on a focal plate arranged in the visual system of the photometer. This, in case of maladjustment of the system, may result in erroneous measurements. The user never can be completely sure that the area marked on the focal plate of the photometer visual system corresponds exactly with the area being photometrically analyzed.

Another construction which permits observing the investigated object and the measuring diaphragm simultaneously, relates to a system in which the light beam coming out of the observation instrument is focused in the plane of the measuring diaphragm which is diagonally adjusted, having the form of a reflecting surface with an aperture corresponding with the photometrically analysed field. Due to such arrangement the mirror measuring diaphragm directs all the reflected light to the visual system of the photometer on the background of the investigated object. The operator observes a dark spot which determines the area being photometrically analysed. The described system is known as a reflection photometer. Said system has the following disadvantages: the image of the measuring diaphragm is dark, thus in its area the part of the object being photometrically analysed is not visible, the measuring diaphragm plane does not cover the image plane of the object, thus in fact the photometrically analysed area is a projection of the measuring diaphragm on the image plane of the object being investigated.

Another known construction is substantially a modification of the reflection photometer described above. In it, the light beam coming out of the observation instrument passes through a light dividing element and is focused in the plane of a mirror measuring diaphragm, and after being reflected from it, the beam returns back along the same path and is directed by the aforesaid dividing element to the visual system of the photometer. On the background of the investigated object the operator observes a dark spot determining the photometrically analysed area. The perpendicular positioning of the measuring diaphragm in this arrangement against the axis of the light beam coming out of the observation instrument caused the necessity of providing the light dividing element, which results in only about 50 percent of the light coming out of the observation instrument reaching the measuring system, and only 25 percent reaching the visual system. The light dividing element enables a part of the light reflected by the mirror diaphragm to come back to the observation instrument system, which affects an additional light diffusion within the instrument.

The fourth construction involves a system in which the light beam coming out of the observation instrument is divided—by means of a light dividing element—into one beam directed to the measuring system, and the other reflected beam directed to the visual system of the photometer. The light beam directed to the measuring system is focused in the plane of a measuring diaphragm which is illuminated from the back. Thus the operator observes a bright spot (image of the measuring diaphragm) on the background of the investigated object, corresponding with the field being photometrically analysed. This arrangement, with regard to the light dividing element being employed has faults similar to those of the arrangement discussed hereinabove. Moreover, the application of a special lighting unit for illuminating the measuring diaphragm complicates the system and requires either additional manipulations for photometrical analysis to be performed or a special mirror with selective transmittance and reflectance to be used.

An object of the present invention is to provide a photometer which permits the simultaneous observation of the object being photometrically analysed and of the measuring diaphragm, and which is free of the disadvantages mentioned above, in the known constructions. In order to achieved this, the optical system is constructed to make possible the observing of the real measuring diaphragm limiting the field photometrically analyzed on the background of the investigated object, which construction will eliminate the light losses on light-dividing surfaces and the light being reflected back to the observation instrument, and will permit the varying of the brightness of the measuring diaphragm in order to match it to the brightness of the object being investigated.

The above aim is achieved by using in the photometer of the invention polarizing beam splitters, or other elements, forming two separate light beams linearly polarized, and phase retarders, for instance quarter-wave plates, which turn the light vibrations direction and change the kind of polarization from linear to circular and vice versa. The images of the measuring diaphragm and of the investigated object are formed by two light beams which are linearly polarized, having two mutually perpendicular light vibrations directions, and being subsequently overlaid for simultaneous observation. In order to obtain two separate light beams linearly polarized there are employed at least one polarizing beam splitter, for instance a glass polarizer with a stack of thin interference layers, known as an interference polarizer, or other polarizer as for example polarizer made from birefringent Nicol's-type crystals. For the projection of the image of the measuring diaphragm, phase retarders turning the direction of the light vibrations are provided in the photometer system.

By introduction of a polarizing filter in the visual system of the photometer into the light beam, and by turning this filter it is possible to change the luminance of images of the measuring diaphragm and of the object being investigated, until one of said images will be completely extinguished. The application of polarized light permits the removal of the detrimental light returning to the observation instrument.

The photometer according to the invention provides a number of technical advantages. It permits the observation of the investigated object and the measuring diaphragm simultaneously, renders possible the adjustment of the brightness of the measuring light spot until it is completely removed from the field of view, it reduces significantly the light losses in comparison with known constructions with typical light-dividing elements. At the same time it eliminates the undesirable appearance of trasition of a part of the light from the photometer into the observation instrument. The photometer according to the invention, due to the use a polarizing beam splitter permits elimination of typical polarizing elements, as for example polaroids, which may be of great importance for investigations in polarized light and for interference observations.

Figure 2:
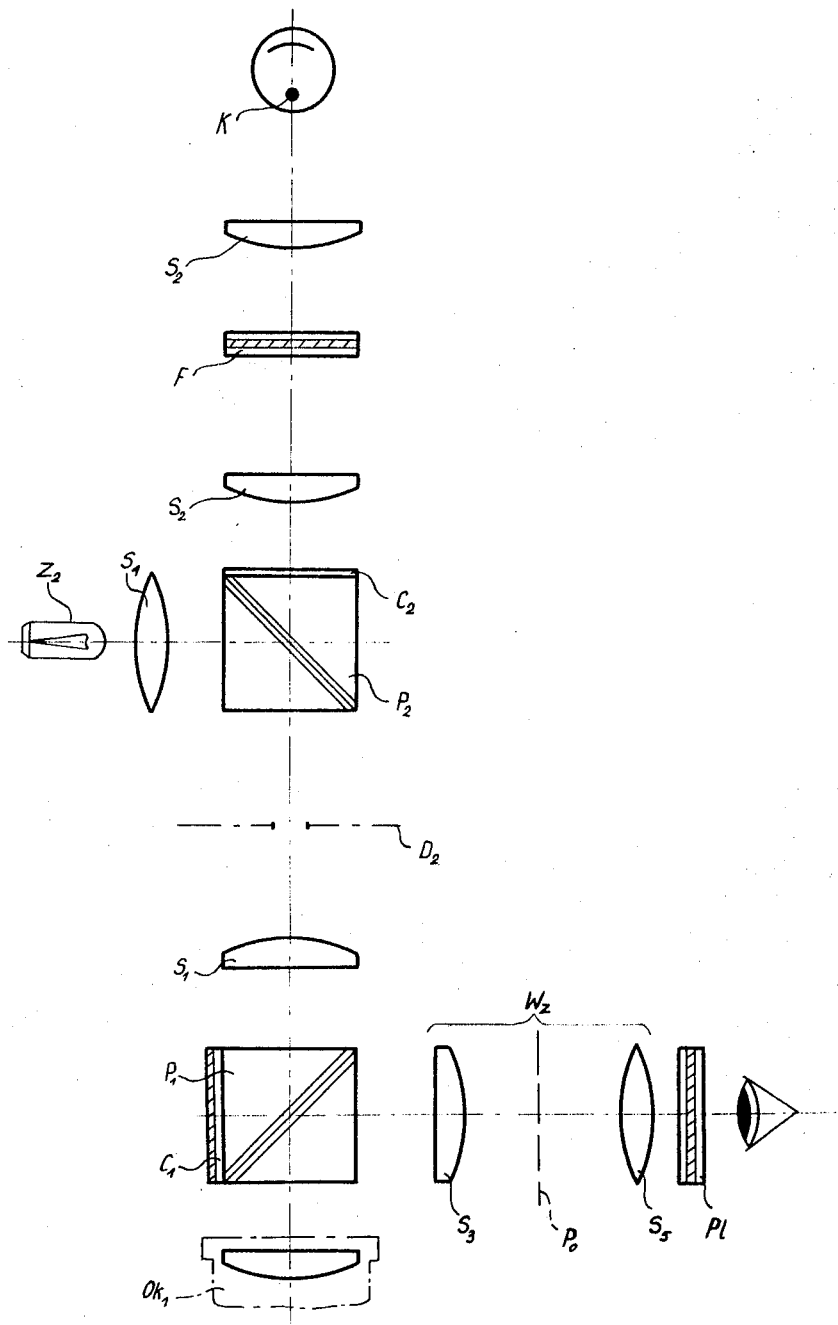

The photometer according to the invention will be further described more particularly with reference to an exemplary embodiment of the invention as shown in the accompanying drawings, in which:

FIG. 1 is a diagram of the optical system of the photometer with one polarizing beam splitter polarizer, and FIG. 2 is a diagram of the optical system of the photometer with two polarizing beam splitters.

The basic members of the photometer according to the invention shown in FIG. 1 are: the eyepiece $Ok_1$ having its axis on the main path of the instrument and the photometer, polarizing beam splitter $P_1$ which provides two separate light beams linearly polarized and angulary related, phase retarders $C_1$ and $C_2$ which change the kind of the light polarization, measuring diaphragm $D_1$ and the polarizing filter P1. The remaining members of the optical system as shown in FIG. 1 are: lenses $S_1$, $S_2$, $S_3$, $S_5$, focal plate $P_o$, the interference filter F and the y photoelectric receiver K. The basic members of the photometer according to the invention, shown in FIG. 2 are: the eyepiece $Ok_1$ two polarizing beam splitters $P_1$ and $P_2$, phase retarders $C_1$ and $C_2$, measuring diaphragm $D_2$ and the polarizing filter P1. The remaining members of the optical system as shown in FIG. 2 are: the light source $Z_2$, lenses $S_1$, $S_2$, $S_3$, $S_4$, $S_5$, focal plate $P_o$, the interference filter F. and the photo-electric receiver K.

The light beam issuing from the ocular $Ok_1$ of the observation instrument falls onto the polarizing beam splitter $P_1$ and becomes polarized and divided into two light beams, one transmitted to the measuring system, and the other reflected to the visual system: both beams are of equal intensity and are polarized in mutually perpendicular polarization directions.

In the exemplary construction of the photometer according to the invention, shown in FIG. 1, in the visual and measuring systems the light transverses the following path:

Within the visual system the light beam being linearly polarized by reflection in and from the polarizing beam splitter $P_1$ passes twice through the phase retarder $C_1$ having a mirror surface, which turns the polarization direction by 90°, and then after passing again through the polarizing beam splitter $P_1$ it is focused by the lens $S_3$ in the focal plate plane $P_o$. The image of the investigated object formed on the focal plate $P_o$ is observed through the ocular $S_5$ of the eyepiece Wz. In the measuring system the lens $S_1$ projects the image of the investigated object in the plane of measuring diaphragm $D_1$. The light polarized by the polarizing beam splitter $P_1$ passes through the phase retarder $C_2$ and after being reflected from the surface of the mirror diaphragm $D_1$ it returns to the arrangement consisting of the phase retarder $C_2$ and the polarizing beam splitter $P_1$. This light beam is entirely reflected towards the eyepiece Wz and focused by the lens $S_3$ on the focal plate $P_o$. In this manner, on the focal plate $P_o$ two images are overlaid, that of the investigated object and that of the investigated object together with the measuring diaphragm, formed by two beams having mutually perpendicular directions of light vibrations. Behind the diaphragm $D_1$ there is provided an auxiliary arrangement $S_2$ which together with the lens $S_1$ Projects the image of the exit pupil of the microscope in the the entrance plane of the photoelectric receiver K, for example on the cathode of a photomultiplier.

In the exemplary construction of the photometer according to the invention, shown in FIG. 2, the path of the light beams is as described below:

Within the visual system the light beam, being linearly polarized by reflection in the polarizing beam splitter $P_1$, is focused by the lens $S_3$ in the focal plate plane $P_o$. In the measuring system, the lens $S_1$ projects the image of the investigated object in the plane of the measuring diaphragm $D_2$. The measuring diaphragm $D_2$ is illuminated from behind with light being linearly polarized by reflection in the polarizing beam splitter $P_2$. The polarization direction of this beam is perpendicular to that of the beam passing through the polarizing beam splitter $P_1$. The light beam after reflection from the polarizing beam splitter $P_1$ in its return passes through the phase retarder $C_1$ with mirror surface twice, which changes the polarization direction by 90°. Then the beam, after passing through the polarizing beam splitter $P_1$, is focused by means of the lens $S_3$ in the plane of the focal plate $P_o$. The operator observes on the focal plate $P_o$ two images simultaneously: of the measuring diaphragm $D_2$ and of the object being investigated. The polarizing beam splitter $P_2$ arranged behind the measuring diaphragm $D_2$ also transmits the beam passing through the polarizing beam splitter $P_1$, which beam passing then through the auxiliary arrangement $S_2$ with the lens $S_1$ projects the image of the exit pupil of the microscope in the entrance plane of the photoelectric receiver K, similarly as in the example shown in FIG. 1.

In both exemplary constructions of the photometer according to the invention, in front of the photo-electric receiver K a light filter F is located in order to select the predetermined wavelength of the light used for measurements. Within the visual system a polarizing filter P1 is located in the path of the beam, which may be disengaged and rotated, whereby the luminance ratio of the measuring diaphragm image to the investigated object image is controlled within an area limited by complete extinguishing of one of said images.

In the above described examples of the embodiments of the invention there may be some modifications of the positioning of the polarizing beam splitter $P_1$, namely: in the exemplary construction shown in FIG. 1 said polarizing beam splitter $P_1$ may be positioned as shown in FIG. 2, and inversely.

What is claimed is:

1. A photometer for observation instruments, mainly microscopes, enabling simultaneous observation of an object being investigated and of a measuring diaphragm limiting the area being photometrically analyzed, comprising:

a main optical path for observation of an object, polarizing beam splitting means dividing said main path into an observation beam path and a measurement beam path, one of which is at an angle to the main path, apertured measuring diaphragm means in said measuring beam path, eyepiece means in said observation beam path for permitting visual observation of the images of said diaphragm means and said object;

said polarizing beam splitting means having at least three ports, linear polarizing means positioned in said beam splitter means common to both beam paths for linearly polarizing un-polarized images incident upon it of said object and said diaphragm, and for diverting linearly polarized images of said diaphragm and said object upon it to the other of said beam paths from which it is incident;

a specular reflecting means in each of said beam paths, said reflecting means in said measuring beam path reflecting the images of said object and said diaphragm to said linear polarizing means for reflection thereby to said eyepiece;

two light retarders, one placed in each beam path between said linear polarizing means and said reflecting means for changing the polarization of said images passed to it from said linear polarizing means and transmitted first by it to circular polarized light, and transmitted again, after reflection from said reflecting means, by it to said linear polarizing means as linear polarized light turned from the images' initial polarization direction, according to the orientation in the above said linear polarizing means;

whereby images of said object and said diaphragm linearly polarized in mutually different directions are passed to said eyepiece and light from said diaphragm means is precluded from passing along the main optical path to said object.

2. A photometer as claimed in claim 1, wherein a photoelectric receiver is positioned in said measuring beam path.

3. A photometer as in claim 1, wherein a linear polarizing element is in the observation path so that upon rotation of said element about the axis of said path, the intensity of the images transmitted along said path will vary.

4. A photometer as in claim 1, wherein illumination means are provided to illuminate said diaphragm in said main beam path via said polarization beam splitter means.

* * * * *